Aug. 19, 1924.

G. B. O'CONNER

AUTO BUMPER

Filed Jan. 24, 1924   2 Sheets-Sheet 1

1,505,662

Witness:
W. F. Hall.

Inventor:
George B. O'Connor
By Hazen and Miller
Attorneys.

Aug. 19, 1924.
G. B. O'CONNER
AUTO BUMPER
Filed Jan. 24, 1924      2 Sheets-Sheet 2
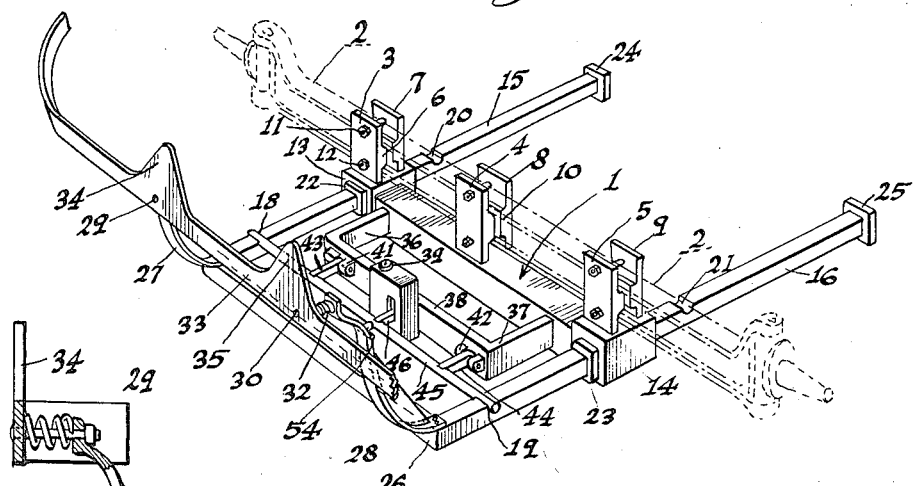
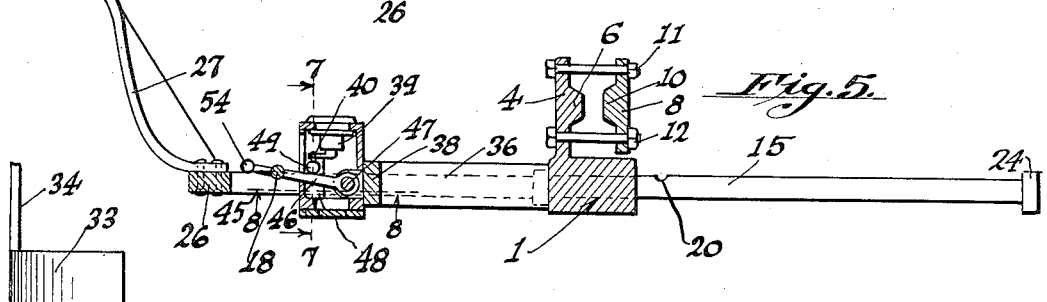
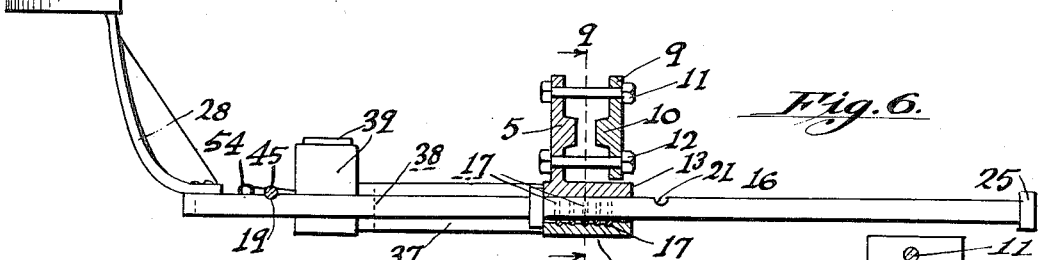
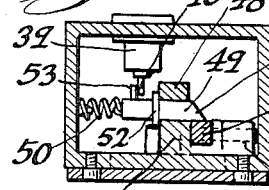
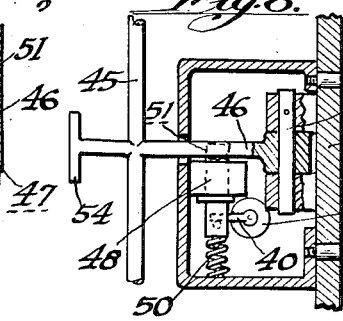

Patented Aug. 19, 1924.

1,505,662

UNITED STATES PATENT OFFICE.

GEORGE B. O'CONNOR, OF LOS ANGELES, CALIFORNIA.

AUTO BUMPER.

Application filed January 24, 1924. Serial No. 688,166.

*To all whom it may concern:*

Be it known that I, GEORGE B. O'CONNOR, a citizen of the United States, residing at Los Angeles, in the county of Los Angeles and State of California, have invented new and useful Improvements in Auto Bumpers, of which the following is a specification.

My invention relates to bumpers for automobiles and the like, and consists of the novel features herein shown, described and claimed.

An object of my invention is to make a bumper which may be extended a considerable distance from its normal position and locked, so as to hold sufficient space in a parking line for the manipulation and removal of the vehicle from the line when the bumper is unlocked and returned to its normal position.

Fig. 4 is a perspective showing the mechanism of the bumper and showing the axle of the vehicle in dotted lines.

Fig. 5 is a fragmentary sectional detail on the line 5—5 of Fig. 1, and drawn upon an enlarged scale.

Fig. 6 is a view analogous to Fig. 5 upon the same plane as Fig. 2 and upon an enlarged scale.

Fig. 7 is a vertical cross-sectional detail on the line 7—7 of Fig. 5.

Fig. 8 is a fragmentary horizontal sectional detail on the line 8—8 of Fig. 5.

Fig. 9 is a fragmentary vertical sectional detail on the line 9—9 of Fig. 6.

Figure 1:
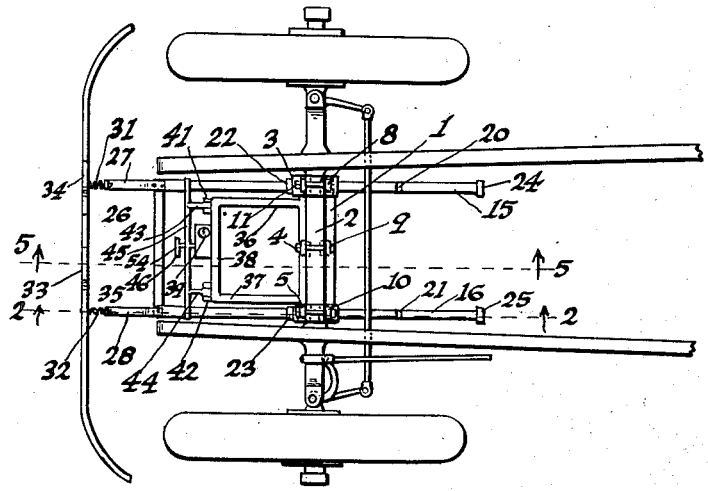
Figure 1 is a fragmentary plan view of a chassis with a bumper applied in accordance with the principles of my invention, the bumper being in normal position.
Figure 2:
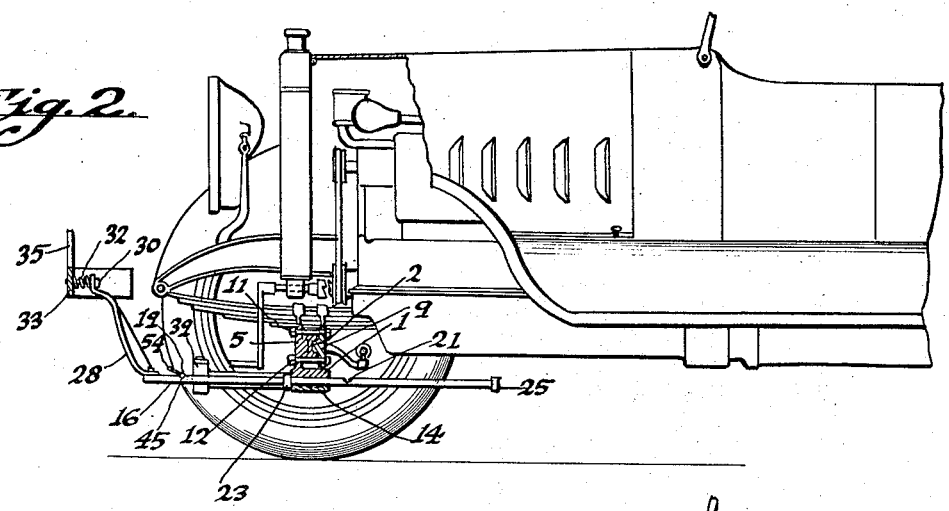
Fig. 2 is a fragmentary side elevation of the vehicle, parts being broken away and shown in section, and the sections being taken substantially on the line 2—2 of Fig. 1.

Referring to Figs. 1 and 4, the base 1 is adapted to fit upwardly against an axle 2. Clamp arms 3, 4 and 5 are formed integral with the base 1 and have lugs 6 to fit one side of the axle 2, and similar clamp arms 7, 8 and 9 are made loose and have lugs 10 to fit the other side of the axle, and bolts 11 and 12 connect the clamp arms 7, 8 and 9 to the clamp arms 3, 4 and 5, the bolts 11 passing above the axle and the bolts 12 passing below the axle, so as to firmly mount the base 1 upon the axle.

Bearing boxes 13 and 14 are formed at the ends of the base 1 and crosswise thereof. The fender supporting bars 15 and 16 slide through the boxes 13 and 14, and the boxes are provided with roller bearings 17 upon which the bars 15 and 16 run. Locking notches 18 and 19 are formed in transverse alinement near the outer ends of the bars 15 and 16, and similar notches 20 and 21 are formed in transverse alinement near the centers of the bars 15 and 16. Stop collars 22 and 23 are fixed upon the bars 15 and 16 in front of the boxes 13 and 14 to limit the inner or backward movement of the bars, and similar stop collars 24 and 25 are formed upon the inner or back ends of the bars 15 and 16 to limit the outward movement of the bars.

A cross piece 26 rigidly connects the forward or outer ends of the bars 15 and 16 and curved posts 27 and 28 are rigidly secured to the outer ends of the bars 15 and 16 and extend outwardly and upwardly. Bolts 29 and 30 are mounted in the upper ends of the posts 27 and 28. Expansion springs 31 and 32 are mounted upon the bolts 29 and 30 against the posts 27 and 28, and the fender bar 33 is mounted upon the bolts 29 and 30 against the springs 31 and 32 so that pressure against the outer face of the fender bar will cause the springs to yield.

Fingers 34 and 35 extend upwardly from the fender bar 33 so that when the fender bar is too low to engage an obstruction the fingers 34 and 35 will increase the effective height of the fender.

Arms 36 and 37 extend from the base 1, and a bar 38 connects the outer ends of the arms. A cylinder lock 39 is mounted near the center of the bar 38 and has an operating finger 40. Pairs of hinge ears 41 and 42 extend outwardly from the bar 38. Arms 43 and 44 are connected to the ears by pivot pins, and the locking bar 45 is connected to the arms 43 and 44, said locking bar being adapted to engage in the notches 18 and 19 and hold the fender withdrawn and in normal position, and to engage in the notches 20 and 21 to hold the fender extended.

An arm 46 extends from the locking bar 45 into the lock mechanism 39 and is mounted upon a pivot 47 within the lock mechanism and in line with the pivots of the arms 43 and 44. A stud 48 extends upwardly from the bottom of the lock box. A beveled latch 49 is slidingly mounted through the stud 48. An expansive spring 50 tends to push the latch 49 into locking position, the opposite end 51 of the latch from the spring 50 being beveled so that when the arm 46 is pressed downwardly the latch will yield until the arm passes the latch and then the latch will snap over the arm to hold the bar 45 in the notches 18 and 19 or 20 and 21. A stop collar 52 is formed upon the latch to limit its movement under the expansion of the spring 50.

A pin 53 extends upwardly from the latch 49 in position to be engaged by the finger 40, so that when the key is inserted into the lock and operated, the finger 40 will engage the pin 53 and withdraw the latch 49 to release the arm 46, so that the bar 45 may be thrown upwardly and the fender moved from normal position to extended position, or vice versa.

A handle 54 extends from the locking bar 45 for convenience in manipulating the bar.

Figure 3:
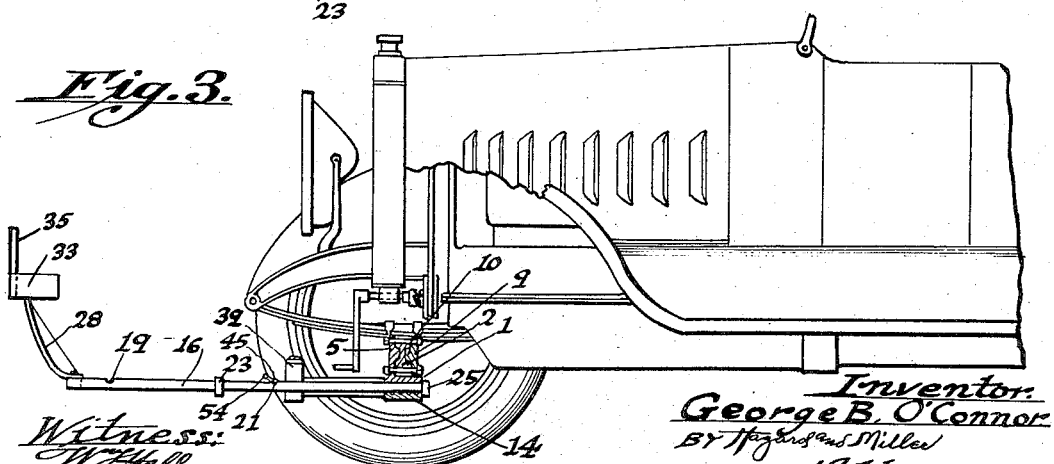
Fig. 3 is a view analogous to Fig. 2 and showing the bumper extended.

In Figs. 1, 2, 4, 5 and 6, the fender is shown withdrawn and locked in normal position, and in Fig. 3 the fender is shown in extended position, that is, with the locking bar 45 in the notches 20 and 21. This increases the effective length of the vehicle, so that when the vehicle is in a parking line it will hold space enough so that the fender may be unlocked and returned to normal position and the vehicle worked out of the line.

Thus I have produced an extensible fender for vehicles comprising bearing boxes adapted to be connected to an axle, bars slidingly mounted in the boxes, a fender bar carried by the sliding bars, there being transversely alined slots in the sliding bars, a locking bar mounted to engage in the slots, and means for locking the locking bar, so that the fender may be withdrawn to normal position and locked, and so that the fender may be extended and locked.

Obviously, when the bumper is extended, as in Fig. 3, it will serve as a stop signal when the vehicle is being operated out of the parking line, and will indicate to any one seeing such operation that the vehicle is being stolen or used without authorization.

Various changes may be made without departing from the spirit and scope of my invention as claimed.

I claim:

1. An extensible fender for vehicles comprising bearing boxes adapted to be connected to an axle, bars slidingly mounted in the boxes, a fender bar carried by the sliding bars, there being transversely alined slots in the sliding bars, a locking bar mounted to engage in the slots, and means for locking the locking bar, so that the fender may be withdrawn to normal position and locked, and so that the fender may be extended and locked.

2. An extensible fender for vehicles comprising a fender bar, supporting bars connected to the fender bar and having transversely alined slots, means for slidingly mounting the supporting bars upon a vehicle, a locking bar mounted to engage in the slots, and means for locking the locking bar for holding the supporting bars in extended positions.

3. An extensible fender for vehicles comprising a fender construction adapted to be mounted upon a vehicle and adapted to be moved to or from the vehicle, and having supporting bars with transversely alined slots, a locking bar mounted to engage in the slots, and means for locking the locking bar to hold the fender construction in an extended position.

4. An extensible fender for vehicles comprising parallel supporting bars rigidly connected and having transversely alined slots, a fender bar yieldingly mounted upon the supporting bars, means for mounting the supporting bars upon a vehicle to slide the fender to or from the vehicle, a locking bar to engage in the slots, and means for locking the locking bar.

In testimony whereof I have signed my name to this specification.

GEORGE B. O'CONNOR.